United States Patent [19]

Starun

[11] 4,374,512
[45] Feb. 22, 1983

[54] INTERNAL COMBUSTION ENGINE HAVING PROVISIONS FOR HEATING THE FUEL-AIR MIXTURE PRIOR TO INJECTION INTO THE CYLINDERS

[76] Inventor: Victor Starun, 3111 Madison St., Wilmington, Del. 19802

[21] Appl. No.: 219,531

[22] Filed: Dec. 23, 1980

[51] Int. Cl.³ ................. F02M 23/04; F02M 31/00
[52] U.S. Cl. ............................. 123/556; 123/585; 123/573; 261/63
[58] Field of Search ............. 123/556, 585, 587, 588, 123/572, 573; 261/63

[56] References Cited

U.S. PATENT DOCUMENTS

| | | | |
|---|---|---|---|
| 1,221,536 | 4/1917 | Hopkins | 123/556 |
| 1,538,966 | 5/1925 | Aragon | 123/556 |
| 2,846,989 | 8/1958 | Eskew | 123/556 |
| 3,024,778 | 3/1962 | Townsend | 123/556 |
| 3,156,225 | 11/1964 | Linn | 123/585 |
| 4,083,343 | 4/1978 | Paton | 123/556 |

FOREIGN PATENT DOCUMENTS 566291 2/1924 France ....................... 123/572

Primary Examiner—Ronald H. Lazarus
Attorney, Agent, or Firm—Abramo & Abramo

[57] ABSTRACT

An improved internal combustion engine having a means for heating the fuel-air mixture by injecting hot air into the carburetor, said hot air having a temperature of at least 150° F. whereby the fuel and the fuel-air mixture is volatilized and the fuel-air mixture is heated to impart turbulence to the fuel-air mixture.

3 Claims, 8 Drawing Figures

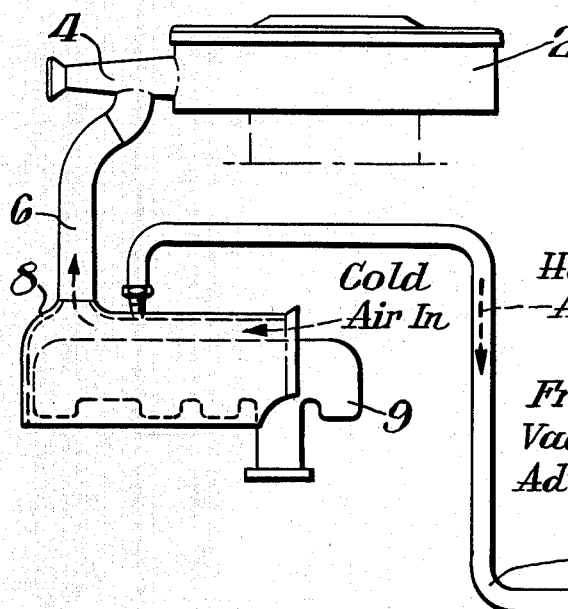
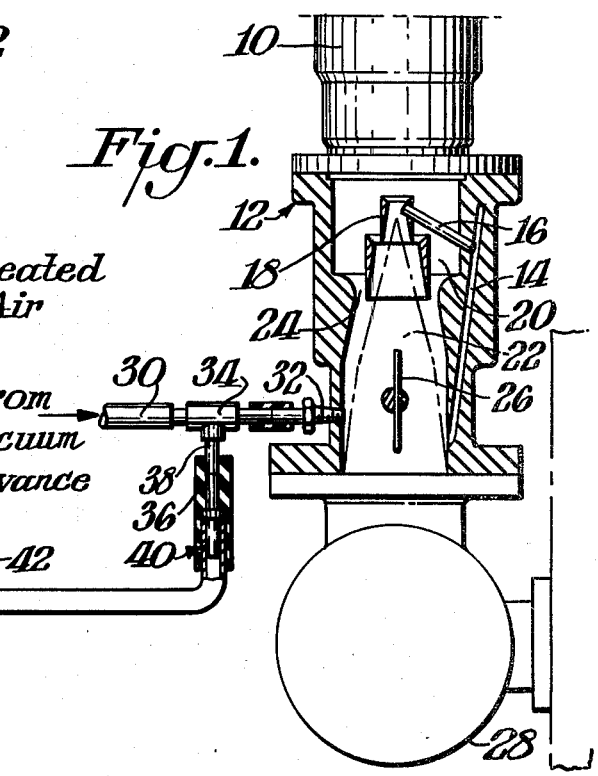
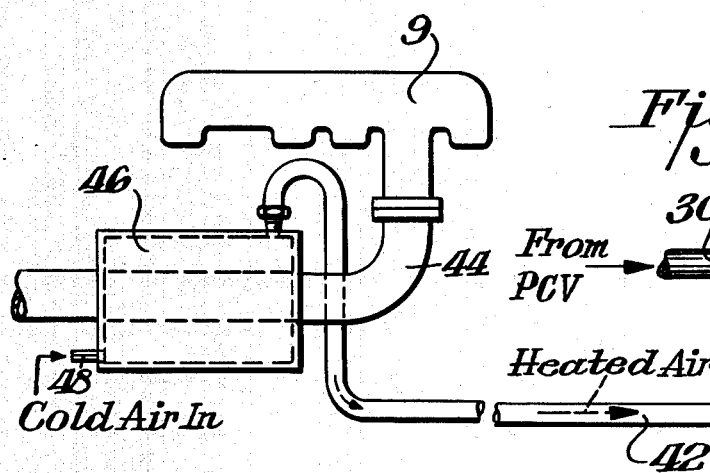
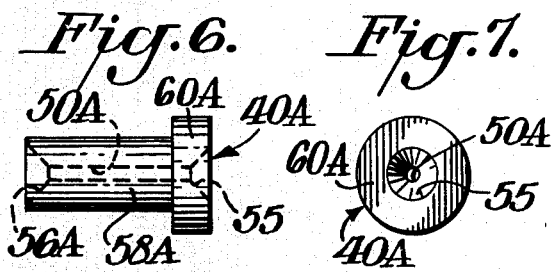
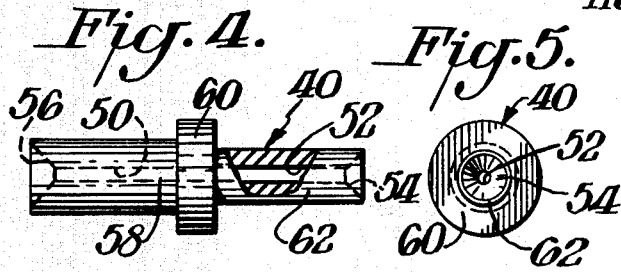
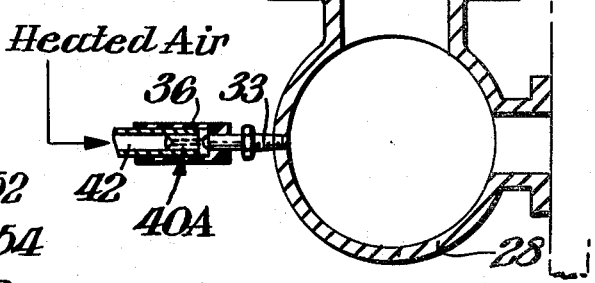

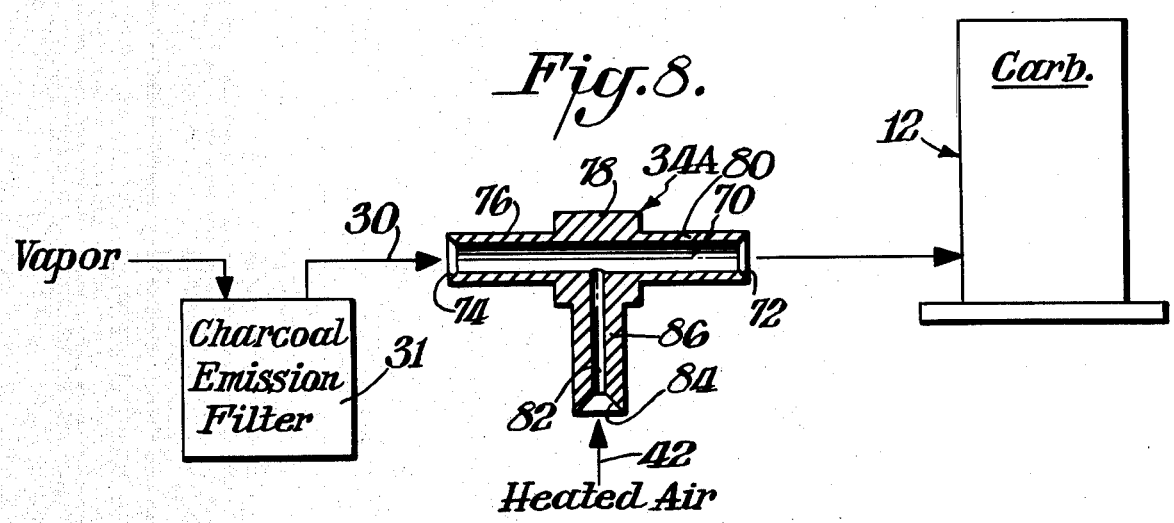

INTERNAL COMBUSTION ENGINE HAVING PROVISIONS FOR HEATING THE FUEL-AIR MIXTURE PRIOR TO INJECTION INTO THE CYLINDERS

BACKGROUND OF THE INVENTION

1. Field of the Invention

This invention relates to the intake system for internal combustion engines in which the fuel-air mixture is heated. This invention is more specifically directed to the intake for internal combustion engines wherein a stream of hot air is injected and mixed with the fuel-air mixture to heat said fuel-air mixture and in part turbulence to the fuel-air mixture for better combustion.

2. Description of the Prior Art

It is well known that the fuel efficiency of an internal combustion engine is improved by heating the fuel-air mixture prior to combustion. Heating can be accomplished by inserting a device in the path of the fuel-air mixture which acts as a heat transfer means for heating the fuel-air mixture. For example, the following patents described various devices used to preheat the fuel-gas mixture:

U.S. Pat. Nos. 3,224,425, 35,300,844, 4,137,881, 596,887, 4,044,742, 3,640,256, 2,018,122, 4,009,701, 1,321,952, 2,254,634 and 3,294,381.

It is also well known that an internal combustion engine can be adapted to precondition the fuel-air mixture prior to combustion in the cylinders by directly introducing into the mixture the hot products of combustion from the exhaust manifold. An example of said art is found in U.S. Pat. No. 1,815,432.

It is further known that heated air can be injected directly into the intake manifold. For example, U.S. Pat. No. 4,167,166 teaches the injection of pressurized air in the manifold. However, this device is not adapted to provide thorough mixing of the heated air with the air-fuel mixture.

This invention has as an object the introduction of hot air to precondition the fuel-air mixture. This invention further has an object to introduce heated air into the air-fuel mixture in a manner to provide complete mixing of the heated air and the air-fuel mixture. To accomplish this end, preferably, heated air is introduced into the carburetor at a point below the throttle valve of the carburetor and not more than two inches below the throttle valve. This invention has, as a further object, the introduction of a limited amount of hot air into the fuel-air mixture by means of a restriction in the tubing conveying the hot air. This restrictor permits the flow of a preferred amount of hot air into the mixture to vaporize and precondition the fuel-mixture for engines having up to 400 cu. inch displacement but any engine can utilize the device. It has been found that the use of my invention appreciably increases the performance of the engine in several respects:

1. If the engine is used in an automobile, the miles per gallon is appreciably increased from 10 to 50% or more depending upon size and age of the engine.

2. More complete combustion of the fuel is achieved which leads to longer spark plug life due to less carbon build-up on the spark plugs.

SUMMARY OF THE INVENTION

This invention is specifically directed to an improvement in an internal combustion engine having a fuel pump means for pumping fuel, a carburetor means for forming a fuel-air mixture, an inlet manifold means for directing the fuel-gas mixture to cylinders and an exhaust manifold means for conveying hot combustion products away from the cylinders wherein the improvement comprises a combination of a heater means for preheating air to a temperature of at least 150° F. and injection means for conveying metered heated air into the fuel air mixture in the venturi zone of the carburetor within a distance of two inches below said venturi zone wherein essentially complete mixing of the heated air and the fuel-air mixture is obtained.

BRIEF DESCRIPTION OF THE DRAWINGS

In the drawings like reference characters designate similar parts in the several views.

FIG. 1 is a perspective view of a portion of a combustion engine showing in cross-section the restrictor positioned in vacuum advance line leading to a carburetor.

FIG. 2 is a perspective view of a portion of an internal combustion engine showing the restrictor introducing heated air into the PCV line of the engine and introducing said hot air into a cavity below the carburetor.

FIG. 3 is a perspective view showing the introduction of heated air at a point in the intake manifold of the engine or alternatively in a point below the butterfly valve of the carburetor.

FIG. 4 is a cross-sectional view of another embodiment of the restrictor of this invention.

FIG. 5 is a cross-sectional view of the restrictor of FIG. 4.

FIG. 6 is a cross-sectional view of an alternative embodiment of the restrictor of this invention.

FIG. 7 is a cross-sectional view of said alternate embodiment of FIG. 6.

FIG. 8 is a diagramatic view showing an alternate embodiment of the restrictor placed in a vacuum line leading from the charcoal mission filter.

DESCRIPTION OF THE PREFERRED EMBODIMENTS

In its broadest sense, this invention comprises a combination of a heat generator for heating air and a means containing therein a restrictor for introducing a controlled or metered amount of heated air to the carburetor of an internal combustion engine at a location wherein the hot air is mixed with a fuel-air mixture from the carburetor prior to the fuel-air mixture being introduced into the cylinders for combustion. The point of introduction is at a point in the venturi zone of the carburetor and within two inches below said zone. The restrictor, which is the heart of the invention, has very specific dimensions for controlling the amount of flow of hot air to be mixed with the fuel-air mixture. It has been found that the opening of the restrictor has an internal cross-sectional diameter of 0.052 inch±0.005 inch. In other words, the opening of the restrictor of this invention preferably has an internal diameter of 0.047 to 0.057 inch. Most preferred, the restrictor has a cross-sectional diameter of 0.052 inch. By placing a restrictor as described above in the hot air line, it has been found that a controlled or metered amount of hot air can be introduced into the fuel-air mixture prior to injection into the cylinder and no additional control or metering means is required. The restrictor can be made out of any gas impervious material such as plastic, for example, nylon or it can be a metal such as, for example, aluminum, brass, steel or copper. Preferably, the restrictor is made of copper or brass. The heater for heating air can be a separate electric heater wherein air is heated to a desired temperature. The heater can be a collector placed around the exhaust manifold which collects hot air heated by the exhaust manifold. The heated air is then sucked into the carburetor or other port for mixing with the fuel-air mixture. The air is heated to a temperature of at least 150° F. Preferably, hot air having a temperature of 150°-300° F. or higher are used.

The hot air can be introduced into any of the vacuum lines into the carburetor or into the intake manifold. For example, the conduit conveying hot air can be introduced into the carburetor for mixing with fuel-air mixture in the line leading from the PVC valve from the fuel vapor canister or vacuum advance.

The method of use of this invention is more particularly described in the drawings in FIGS. 1-6. In FIG. 1, a portion of an internal combustion engine is shown. The air filter canister 2 which filters cold air for introduction to the carburetor 12 has an air scoop 4 leading to the air filter canister. Hot air is conveyed to the air scoop by means of a hose 6 which leads from a cover covering the exhaust manifold 9. Cold air enters into the cover surrounding the exhaust manifold and is then heated. Heated air is conveyed by means of line 42 from the exhaust manifold cover. The amount of heated air is controlled by the restrictor 40 which is placed in the line 42. Heated air is sucked into the line 30 from the vacuum advance by means of a T connection 34. The gases from the vacuum advance and heated air are injected into the carburetor 12 by means of a jet 32.

The workings of a carburetor for a combustion engine are well known. In the drawings, the carbureted housing 12 has a venturi 18 which necks down into another venturi area 24. The flow of air flowing through the restriction 24 and then into the opening 22 creates a vacuum. Gasoline is injected into the carburetor through lines 14 and 16. The air-fuel mixture flowing through the carburetor is controlled by a butterfly valve 26. The fuel-air mixture consisting of volitalized gasoline droplets of gasoline suspended into the air from the air filter canister 2 are mixed with heated air coming from the injection point 32. The mixture of the heated air and the air-fuel mixture flow into the inlet manifold 28.

FIG. 2 represents an alternate embodiment of the invention wherein heated air is collected in a chamber 46 constructed around the exhaust pipe 44 leading from the exhaust manifold 9. The chamber can be constructed of sheet metal. Cold air is sucked into the chamber by means of port 48. The cold air is heated up by being in contact with the exhaust manifold which is heated by the hot exhaust gases ejected after combustion of the fuel-air mixture in the cylinders. The heated air flows through the restrictor 40A which to a T-connector 34 in the PCV line 30 and the hot air in the line 42 is conveyed into the carburetor at a point adjacent to the butterfly valve 26. Still another embodiment is shown in FIG. 3 where the restrictor 40A is placed directly in a line 42 leading into the inlet manifold 28 at a point below the butterfly valve. In this embodiment the injection point should be within two inches of the butterfly valve to assure complete mixing of the heated air and fuel-air mixture.

In FIG. 3, heated air is conveyed into the inlet manifold 28 instead of the carburetor as shown in FIG. 2. FIG. 4 shows the restrictor which controls or meters the flow of hot air into the carburetor. The restrictor 40 is composed of a hollow tube having the requisite internal diameter 52. The outer portion of 58 of the restrictor is a tube adapted for receiving a rubber hose conveying the heated air. A second inner portion 62 of the restrictor is likewise adapted for receiving a rubber tube coupling to connect the restrictor to an injection port such as 32 of FIG. 1 into the carburetor. The ends of the restrictor have countersinking grooves 54 and 56 to provide smoother flow of air through the restrictor. A barrel portion 60 between the outer portion 58 and 62 is provided for strength.

FIG. 5 shows a cross section of the restrictor shown in FIG. 4. A truncated restrictor 40A is shown in FIG. 6 as another embodiment of the restrictor of this invention. The inside orifice 50A runs an extension portion 58A and is of the requisite diameter. Countersunk groove portions 55 and 56A are provided for better flow of air. A barrel portion 60A similar to the barrel 60 of FIG. 1 is provided which serves to provide strength to the restrictor and as a means for attaching the restrictor to a rubber hose leading to the carburetor.

FIG. 7 is a cross-sectional view of the restrictor of FIG. 6. FIG. 8 shows still another embodiment of the invention consisting of a T version of a restrictor 80, one leg of the T, 86 contains an orifice running the length of the leg of the requisite diameter. Leg 86 shown is that which meets to form a right angle with the other tube forming the T having an orifice 70 with a cross-sectional diameter of $\frac{1}{4}$ to $\frac{3}{8}$ inch. A barrel portion 78 holds the three tubes 76, 80 and 86 in relation to one another. Each of the tubes 76, 80 and 86 have countersunk grooves 72, 74 and 84. Heated air is conveyed by line 42 and sucked into the T. The heated air provides increased turbulence to the air-fuel mixture which unexpectedly provides more uniform combustion of the fuel in the cylinders.

Automobiles using my invention have shown increased mileage of an amount of 10 to 50% depending upon the automobile. The installation of the sytem on an automobile creates an increase in the RPM's of the automobile without further adjustments. Other advantages are obtained by the use of my invention on a combustion engine. More complete combustion of the fuel results in less carbon build-up on the spark plugs giving greater spark plug life. Likewise, the oil in the engine last longer since the engine runs cleaner.

As stated above, the restrictor automatically controls the amount of hot air injected into the carburetor by accelerator (throttle) control and demand.

I claim:

1. An attachment to an internal combustion engine having a carburetor means for forming a fuel-air mixture and a butterfly valve, an inlet manifold means for directing the fuel air mixture to cylinders for combustion of the fuel-air mixture and exhaust means for conveying hot combustion gases away from the cylinders, the improvement consisting of a means of injecting a metered quantity of air heated to a temperature of at least 150° F. to the carburetor means in a region in the venturi zone, said region extending from the butterfly valve to a point two inches below the butterfly valve comprising:

(a) a heater means for heating air to a temperature of at least 150° F.;
   (b) first tube means for conveying said heated air to the carburetor means in said region in the venturi zone from the butterfly valve to a point two inches below the butterfly valve; and (c) second tube means comprising either a PCV or a vacuum advance line connecting to the first tube means upstream of the point where the first tube means joins the venturi zone;

(d) a restrictor for metering a quantity of air flowing therethrough positioned in the second tube means comprising a tube with an internal orifice for the passage of heated air from a source of heated air, said tube having an upstream and a downstream end, said restrictor being positioned in said tube means at a pointdownstream of the heater and upstream of the carburetor means, said internal orifice having a diameter of 0.047 to 0.057 inch and said upstream and downstream ends of the restrictor being tapered inwardly to produce a jet action in the flow of heated air thereby causing said heated air to be injected into the carburetor means.

2. The internal combustion engine of claim 1 wherein the restrictor has an orifice having an internal diameter of 0.052 inch.

3. The engine of claim 1 wherein the air is injected into the carburetor is heated to a temperature of 150° to 300° F.

* * * * *